F. ORBELL.
CONVEYING AND ELEVATING MECHANISM FOR HARVESTING, THRESHING, AND CHAFF CUTTING MACHINES, HAY LOADERS, AND THE LIKE.
APPLICATION FILED MAR. 21, 1912.
1,052,372.  Patented Feb. 4, 1913.
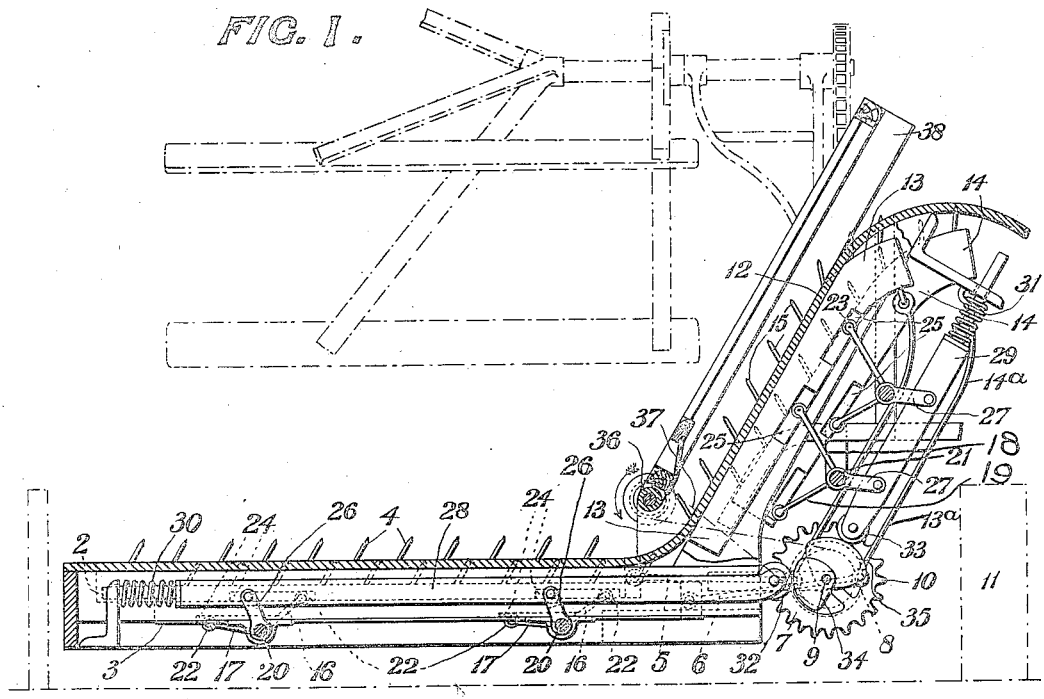
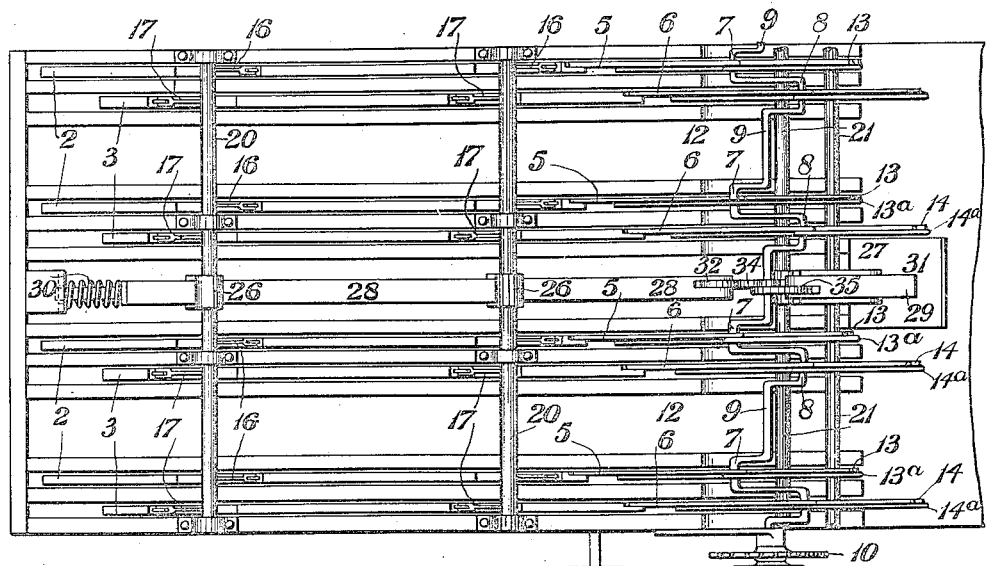

UNITED STATES PATENT OFFICE.

FREDERICK ORBELL, OF CASTLE HEDINGHAM, ENGLAND.

CONVEYING AND ELEVATING MECHANISM FOR HARVESTING, THRESHING, AND CHAFF-CUTTING MACHINES, HAY-LOADERS, AND THE LIKE.

1,052,372.  Specification of Letters Patent.  Patented Feb. 4, 1913.

Application filed March 21, 1912. Serial No. 685,151.

*To all whom it may concern:*

Be it known that I, FREDERICK ORBELL, a subject of the King of Great Britain, residing at St. James street, Castle Hedingham, Essex, England, have invented certain new and useful improvements relating to conveying and elevating mechanism for harvesting, threshing, and chaff-cutting machines, hay-loaders, and the like, of which the following is a specification.

This invention is for improvements relating to reaping, mowing, harvesting, binding machines, hay-loaders and the like, and the invention has for object an improved conveyer and elevator mechanism for transporting the crop and for delivering the same to the binder mechanism, to another part of the machine or to a wagon, for feeding corn and the like to a threshing machine, or straw to a chaff-cutting machine, or for raising hay or corn to a wagon or to a stack. The conveyer or elevating mechanism is of the kind in which a number of bars having tines or spikes projecting therefrom and adapted to engage the cut crops are reciprocated by means of a crank shaft operated from a suitable source. According to the invention the aforesaid bars are so actuated that each bar is constantly parallel to the plane of movement of the crop into which plane each bar is projected suddenly prior to its forward or operative stroke and from which plane each bar is withdrawn suddenly at the completion of said operative stroke and prior to its rearward or inoperative stroke, the arrangement being such that a continuously forward movement is imparted to the crop by the bars.

The accompanying drawings illustrate, by way of example, the application of the invention to the platform and elevator of a sheaf binding harvesting machine of a well-known type, a considerable portion of the usual mechanism being, for the sake of simplicity, omitted as will be perfectly clear to those skilled in the art.

Figure 1 is a central longitudinal section through the platform and elevator. Fig. 2 is an underside plan view of the platform and elevator and mechanism for operating same, the remaining parts of the machine being omitted.

The platform upon which the crop, when cut by the knife, falls is provided with channels or grooves in which operate a series of bars 2, 2, 2, 2, and a series of bars 3, 3, 3, 3, having upwardly projecting tines or prongs 4 to engage the stems of the cut crop, each of said bars being adapted to be reciprocated by being connected at its forward extremity by means of connecting rods 5, 5, 5, 5, and 6, 6, 6, 6, respectively to cranks 7, 7, 7, 7, and 8, 8, 8, 8, upon a driving shaft 9 having a chain wheel 10 from which said shaft 9 derives rotary motion through a chain (not shown) and the usual bevel or other gearing connected in the ordinary manner with the road wheel 11; the cranks appropriate to the series of bars 2 being set at 180 degrees from the cranks appropriate to the series of bars 3. From the platform the crop is carried by the tines or prongs 4 to the elevator which consists of an inclined frame 12 having grooves or channels and similar series of bars 13, 13, 13, 13, and 14, 14, 14, 14, with tines 15 which operate to raise the crop to the binding mechanism whence it is delivered in sheaves in the usual manner. Said series of bars 13 and 14 are connected to cranks 7, 7, 7, 7, and 8, 8, 8, 8, by means of connecting rods $13^a$, $13^a$, $13^a$, $13^a$, and $14^a$, $14^a$, $14^a$, $14^a$, respectively.

In order to project the tines 4 and 15 into and to withdraw same from the plane of movement of the crop the bars of each series 2, 3, 13, and 14 are connected in groups by means of arms 16, 17 and 18, 19, to pairs of transverse rock-shafts 20, 20, and 21, 21, respectively, situated transversely beneath the aforesaid platform and inclined elevator respectively; the arms 16 of the bars 2 being disposed at right angles to or approximately at right angles to the arms 17 of the bars 3, and the arms 18 of bars 13 being similarly arranged with respect to the arms 19 of bars 14. Said arms 16, 17, 18 and 19 are fast with their respective rock-shafts and engage corresponding bars by means of anti-friction rollers 22, 22, 22, 22, 23, 23, 23, 23, taking into recesses 24, 24, 24, 24, 25, 25, 25, 25, respectively, formed at the undersides of the several bars. Said rock-shafts 20, 20, and 21, 21, have rigidly mounted thereon arms 26, 26, and 27, 27, respectively whereby said rock-shafts are connected to rods 28, and 29 respectively which are destined to impart angular movement in one direction to said rock-shaft. The rods, 28, 29 are provided at one extremity with springs 30, 31, and at the opposite extremity with anti-friction rollers 32, 33, adapted to engage suitably profiled cams 34, 35, mounted side by side upon the main driving shaft 9; whereby rods 28, 29, are urged against the tension of the springs 30, 31; said rods being returned to their normal positions by said springs which cause reversal of the direction of movement of the rods 28, 29 immediately reëntrant portions upon the peripheries of cams 34, and 35 are brought into contact with the rollers 32, 33. The reciprocation of the rods 28, 29, is transmitted by the arms 26, 26, and 27, 27, to the rock-shafts 20, 20, and 21, 21, which are thereby moved angularly.

When in operation the chain wheel 10 receives rotary motion by means of the gearing (not shown) connecting it with the road wheel 11 and the crank shaft 9 is consequently rotated. Rotation of the crankshaft 9 serves through links 5, 6, 13ª and 14ª, to reciprocate the tine bars 2, 3, 13 and 14. In addition to this reciprocation the tine bars are projected suddenly by a parallel motion toward or are withdrawn suddenly by a similar motion from the plane of movement of the crop, such motion in a direction toward said plane being imparted to all the bars 2 and 13, simultaneously with a motion in a direction away from said plane to all the bars 3 and 14. By this means the series of bars are raised and lowered alternately all being constantly parallel with the plane of movement of the crop, so that as the tines on the one series are withdrawn from the moving crop those upon the other series engage and carry the same forward or upward, as the case may be, without intermission.

A roller 36 driven from crank shaft 9 by a cross-belt 37 and situated at the foot of the elevator serves to direct the crop beneath an upper guide 38 which, contrary to the upper elevator canvas employed with the usual endless moving canvas conveying and elevating mechanisms, exerts no pressure upon and consequently does not tend to damage the crop.

By means of the aforesaid parallel motion imparted to the various tine bars a more uniform action than heretofore is exerted upon the traveling crop, and by the sudden projection of said bars into the plane of movement of the traveling crop the tines throughout the whole length of the bars engage simultaneously with the crop and thus produce a uniform tractive action upon the entire crop disposed for the time being throughout the length of the platform or the elevator, as the case may be.

Without departing from the spirit of the invention various modifications may be effected in accordance with different applications of the conveyer or elevator mechanism, and any desired number of bars whereof one series is moving upward and forward as the other series commence to move downward and backward may be employed in order to impart a continuously forward movement to the crop or material under transport.

What I claim is:—

1. In an apparatus of the character set forth, two groups of parallel conveying members, a transverse shaft connected to the members of the respective groups to produce opposite reciprocatory movements thereof, rock shafts, each having angularly disposed arms adapted to furnish support for the members of the respective groups in their reciprocatory movements, a reciprocatory member connected to said rock shafts to produce rocking movements thereof, and means on said transverse shaft to produce movements of said reciprocatory member.

2. In an apparatus of the character set forth, two groups of parallel conveying members, the members of one group being arranged alternately with respect to the members of the other group, a transverse shaft having a plurality of alternately arranged oppositely projecting crank arms connected respectively to said members, a pair of rock shafts each equipped with angularly disposed arms adapted to support the respective groups, a reciprocatory bar connected to said rock shafts to operate the same, and means for operating said reciprocatory bar from said transverse shaft.

3. In a sheaf binding harvesting machine conveying, elevating and like mechanism, comprising a platform, an elevator, each having longitudinal slots; a plurality of bars carrying tines and operating in said longitudinal slots; recesses in said bars, a crankshaft and connecting rods connected to said bars; means for driving said crankshaft; a plurality of rock shafts disposed transversely of the platform and elevator, arms rigidly mounted on said rock-shafts and engaging said recesses, rods connected to said rock-shafts and disposed longitudinally of the platform and elevator and means for reciprocating said rods.

4. In a sheaf binding harvesting machine conveying, elevating and like mechanism, comprising a platform, an elevator, each having longitudinal slots; a plurality of bars carrying tines, recesses in said bars; a crankshaft and connecting rods connected to said bars; a chain wheel on said crank shaft and means for driving same; a plurality of rockshafts disposed transversely of the platform and elevator; lifting arms attached to said rockshafts and carrying rollers engaging with said recesses; rods disposed longitudinally of said platform and elevator and operably connected to rocking arms attached to said rockshafts; rollers on said rods engaging cams carried by said crank shaft and springs on said rods maintaining contact between said rollers and cams.

In testimony whereof I have hereunto set my hand in presence of two subscribing witnesses.

FREDERICK ORBELL.

Witnesses:
ERNEST JOHN HILL,
HARRY JOHN STOPEN.